United States Patent [19]
Rice

[11] Patent Number: 5,589,067
[45] Date of Patent: Dec. 31, 1996

[54] EXPANDED METAL FILTER SUPPORT STRUCTURE

[75] Inventor: Patrick E. Rice, Winthrop Harbor, Ill.

[73] Assignee: Jason, Inc., Milwaukee, Wis.

[21] Appl. No.: 529,308

[22] Filed: Sep. 18, 1995

[51] Int. Cl.$^6$ .................................................. B01D 27/06
[52] U.S. Cl. ..................... 210/493.5; 210/497.2; 210/498; 55/500; 55/521; 29/6.1; 29/896.62; 29/902
[58] Field of Search ................. 55/492, 498, 500, 55/520, 521, 525; 29/6.1, 163.8, 902, 896.62; 210/493.1, 493.4, 493.5, 497.01, 497.2, 498, 499

[56] References Cited

U.S. PATENT DOCUMENTS

| | | | |
|---|---|---|---|
| 2,218,007 | 10/1940 | Miller | 29/6.1 |
| 2,989,145 | 6/1961 | Goodloe | 55/525 |
| 4,317,727 | 3/1982 | Meissner | 210/493.1 |
| 4,881,307 | 11/1989 | Gaissmaier | 29/6.1 |

OTHER PUBLICATIONS

Demister, Bulletin 35, Otto H. York Company, Inc., 6 Central Avenue, West Orange, N. J., p. 3. Apr. 1966.
Keene Products from Metalex®, A Division of The Koller Group, Inc., "A guide for specifying premium quality expansion and control joints, casing and corner beads, drip screed and other trim products", pp. 1–8.
Metalex, "Manufacturer of Quality Expanded Metal, " pp. 1–12.

Primary Examiner—W. L. Walker

[57] ABSTRACT

A generally planar expanded metal filter media support structure is provided. The filter media support structure includes a first row of perforations mutually separated, one from another, by a perforation distance along a first axis parallel to the plane of the support structure and at least a second row of perforations parallel to the first row of perforations offset from the first row of perforations along the first axis by a first offset distance greater than zero and less than one-half the perforation distance and offset along a second orthogonal axis in the plane of the support structure by a second offset distance.

12 Claims, 3 Drawing Sheets

EXPANDED METAL FILTER SUPPORT STRUCTURE

FIELD OF THE INVENTION

The invention relates to fluid filtering devices and more particularly to a structure for the support of filter media.

BACKGROUND OF THE INVENTION

Cartridge type filters and screw-on filter units are known. A cartridge filter is generally constructed to be inserted inside a filter housing and has no integral housing of its own. A screw-on filter generally has an external housing which surrounds the filter and which routes the filtered fluid to and from the filter. Cartridge filters and the filters found within the outside housing of a screw-on filter unit are typically constructed of a cylindrical shape with the filter media disposed radially along an outside surface of the filter. The filter media is typically pleated in some manner along the longitudinal axis of the filter to increase the overall filtering surface.

The filter media is typically supported by a filter media support structure which is also typically pleated along a longitudinal axis. The filter media support structure is, in turn, supported by a pair of end caps at least one of which may engage a filter housing and direct fluid flow along an outside surface of the filter through the filter media and to a filter return path lying along a center axis of the filter.

The filter media used within filters is often a woven material that may consist of a single layer of filtering material or several layers. The material used depends on the aggressiveness of the fluid to be filtered, the viscosity of the fluid, the abrasive grit or other contaminants to be removed from the filtered fluid and the flow the filtered fluid.

Where the filtered fluid is viscous or when contaminants begin to accumulate in the filter media partially blocking flow, a pressure differential develops across the filter. The pressure differential can cause the filter support structure to compress axially, causing the spaces between adjacent pleats of the pleated filter structure to close up (nest) further blocking flow of the filtered fluid.

Reduced flow of filtered fluids can lead to damage where the filtered fluid is oil and the oil serves to lubricate an internal combustion engine. Reduced flow can also lead to damage in hydraulic systems where the filtered fluid supplies a hydraulic pump and where cavitation caused by a partial blockage of fluid flow can lead to erosion of the structure of the pump. Because of the importance of fluid filtering, a need exists for a mechanism to reduce pressure induced blockage of filters caused by pressure differentials.

SUMMARY OF THE INVENTION

It is an object of this invention to provide a filter support structure that is substantially free-flowing even under conditions of partial collapse of the filter support structure.

It is a further object of this invention to provide a filter support structure that is easily and inexpensively fabricated.

These and other objects are provided by a generally planar expanded metal filter media support structure. The filter media support structure includes a first row of perforations mutually separated, one from another, by a perforation distance along a first axis parallel to the plane of the support structure and at least a second row of perforations parallel to the first row of perforations offset from the first row of perforations along the first axis by a first offset distance greater than zero and less than one-half the perforation distance and offset along a second orthogonal axis in the plane of the support structure by a second offset distance.

DESCRIPTION OF A PREFERRED EMBODIMENT

Figure 1A:
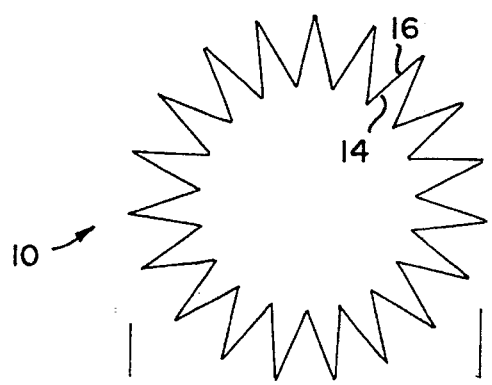
FIGS. 1a and 1b depict a top and side view of a filter in accordance with an embodiment of the invention.
Figure 1B:
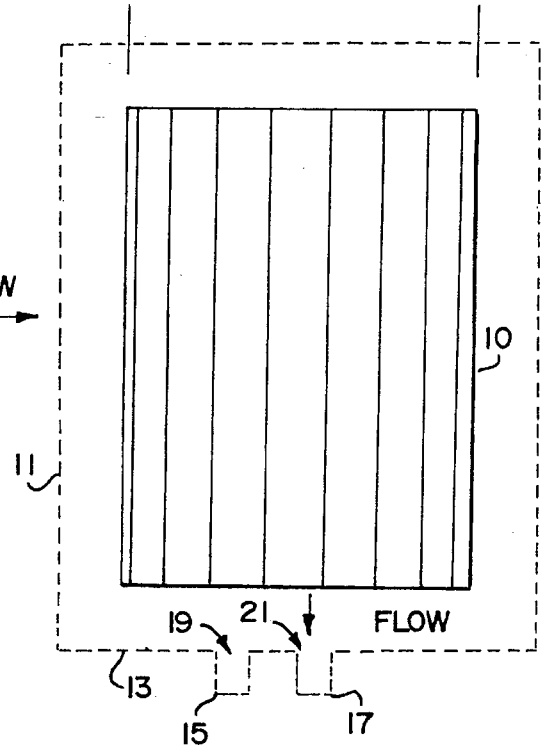
Figure 3:
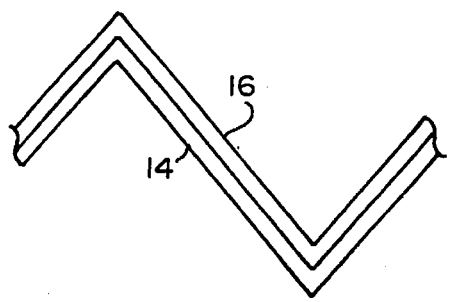
FIG. 3 depicts a cut-away section of the filter structure of FIG. 1.
Figure 2:
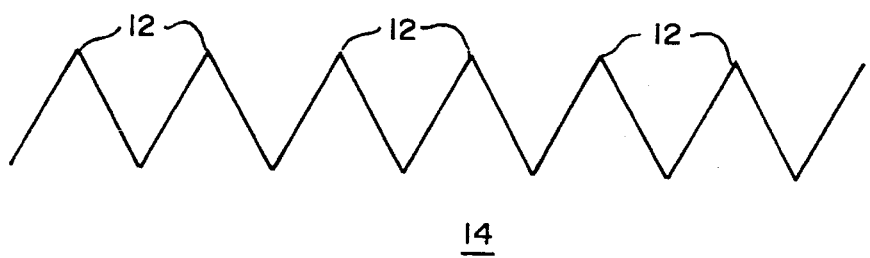
FIG. 2 depicts a filter support structure of the filter of FIG. 1.

FIG. 1 depicts in combination a fluid filter 10, and pressure vessel 11 (with flange 13 and inlet connection 15, outlet connection 17, inlet port 19 and outlet port 21) generally, in accordance with an embodiment of the invention. The filter 10 may be of the cartridge type or of a type found within a screw-on filter. The filter 10 generally has a hollow cylindrical shape made up of a filter support structure 14 and a filter media 16 disposed over an outer surface of the filter support structure 14 (shown in cut-away view in FIG. 3). The filter support structure 14 may be formed by crimping a rectangular piece of expanded sheet metal 26 along a longitudinal axis with a series of parallel and alternately reversed crimps as shown in FIG. 2. The alternately reversed crimps serve to form a number of parallel pleats 12 that lend strength to the filter support structure. The support structure 14 of the filter 10 of FIG. 1 may be formed from the crimped metal of FIG. 2 by joining opposing, longitudinal ends of the crimped metal plate lying parallel to the crimps to form a pleated shell.

Under the embodiment, the rectangular piece of expanded sheet metal 26 (from which the filter support structure is fabricated) is made of sheet metal 28 that has been expanded in such a way as to resist filter blockage caused by nesting of the pleats 12 during use caused by filter pressure differentials.

Figure 4:
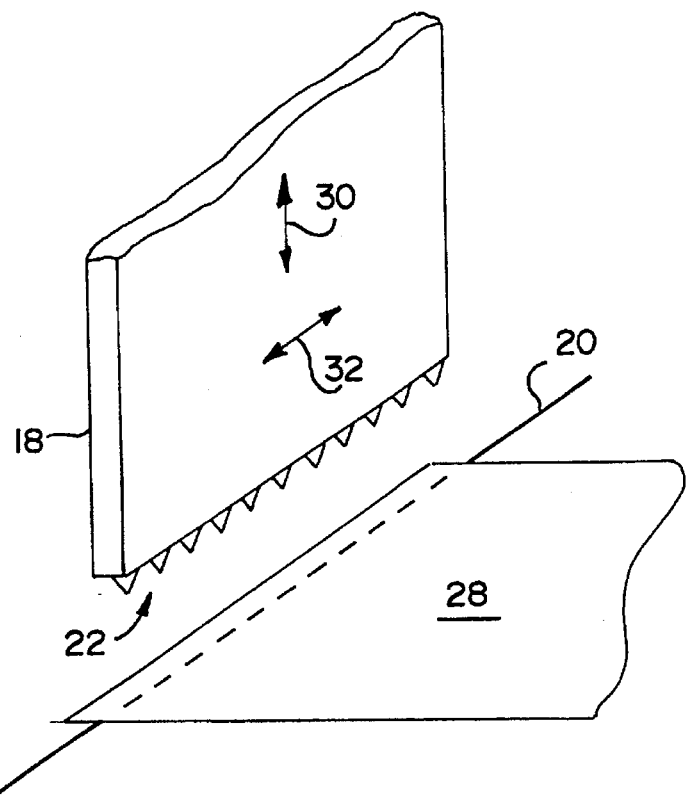
FIG. 4 depicts apparatus for making the filter support structure of FIG. 1.
Figure 6:
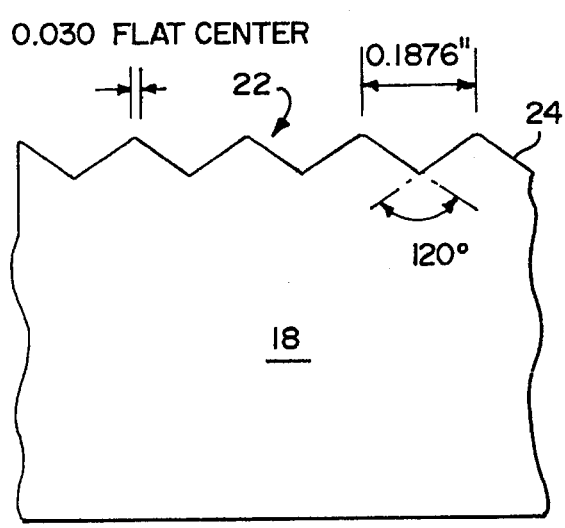
FIG. 6 depicts a die cutting edge used in the manufacture of the filter of FIG. 1.
Figure 7A:
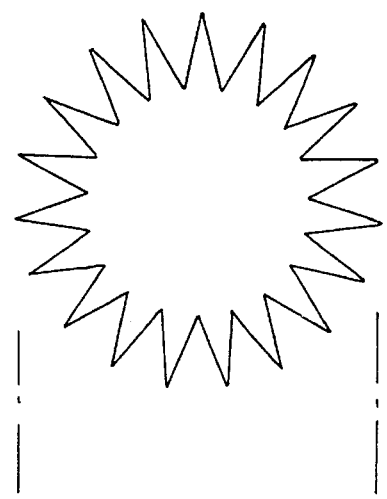
FIGS. 7a and 7b depict a top and side view of the filter support structure of FIG. 1.
Figure 7B:
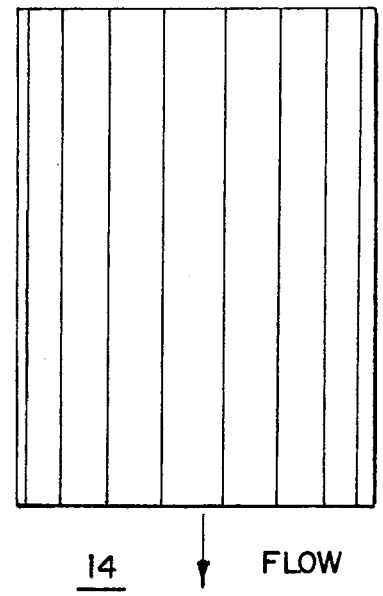

Under the embodiment, the filter support structure 14 is made using a stamping press (the die 18 and shear edge 20 of which are shown in FIG. 4). Under the embodiment, the cutting edge 22 of the die 18 is composed of a number of triangular cutting points 24, the details of which are shown in FIG. 6.

The sheet metal 28 used for fabrication of the expanded metal plate 26 may be relatively thin (e.g., 0.012 inch) and may be made of a corrosion resistant material for corrosive filtered fluids (e.g., stainless steel) or of a less expensive material for non-corrosive materials (e.g., tin-plated carbon steel, aluminum, etc.).

To create the expanded metal 26 of the filter support structure 14, the sheet metal 28 is advanced through the stamping press (cutting die 18 and shear edge 20) at a relatively slow rate per die stroke (e.g., 0.017–0.020 inch).

On each alternate vertical stroke (30, FIG. 4), the die 18 is offset horizontally (32, FIG. 4) to produce a non-nesting filter support structure 14 that does not block filter fluid flow when compressed axially during use. Under the embodiment, the offset is of a distance greater than zero inches and less than one-half the spacing (0.1876 inch) of the triangular cutting points 24. Alternately, the die 18 may be offset a multiple of one-half the spacing plus a distance greater than zero and less than one half the spacing of the triangular cutting points 24. Under a preferred embodiment, in fact, the die is offset by the fractional value of ⅔ of the spacing of the points 24 on alternate vertical strokes 30.

Figure 5:
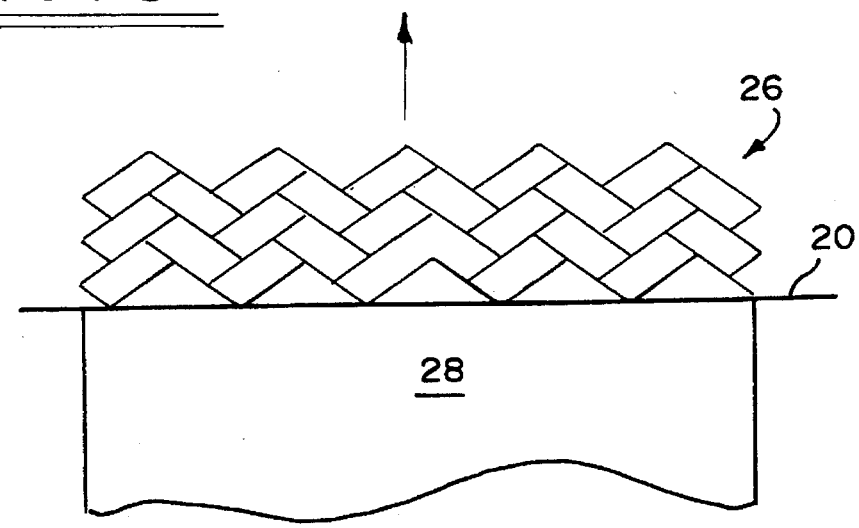
FIG. 5 depicts an interim result of filter support structure manufacture of the filter of FIG. 1.

FIG. 5 shows a simplified sketch of the appearance of the expanded metal 26 of the filter support structure 14 as it progresses past the shear edge 20. As can be observed from FIG. 5 the apertures created by the triangular cutting points 24 have a shape that is generally twice as long as wide and present the general appearance of a herringbone design.

Following expansion of the sheet metal 28 within the stamping die, the expanded metal 26 may be rolled for easier processing in subsequent operations, or used directly. Whether rolled or not, the expanded metal 26 is crimped to provide the filter support structure 14 shown in FIG. 2. To obtain maximum workability, the expanded metal 26 is crimped along an axis parallel to the original stamping operation (i.e., parallel to the shear edge 20 of FIG. 5).

Fabrication of a filter support structure 14 of expanded metal under the described embodiment results in a filter structure that remains relatively free-flowing even under conditions where the filter support structure has nested due to a pressure differential across the filter media. Such a filter support structure offers substantial benefits in the long term operation of equipment and structure relying of the free flow of filtered fluids.

A specific embodiment of novel methods and apparatus of providing a free-flowing filter media support structure according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

I claim:

1. A filter media support structure comprising:

a generally cylindrically shaped pleated shell with each pleat of the pleated shell aligned parallel to a longitudinal axis of the shell and distributed around a circumference of the shell to form a zig-Zag patterned outer wall of the pleated shell around a circumference of the shell, when viewed in cross-section;

a first row of perforations parallel to the longitudinal axis in a planar element of each pleat of the pleated shell, mutually separated one from another by a perforation distance; and at least a second row of perforations parallel to the first row of perforations offset from the first row of perforations along the longitudinal axis by a first offset distance greater than zero and less than one-half the perforation distance and offset along a second orthogonal axis of the planar element transverse to the longitudinal axis by a second offset distance.

2. The apparatus as in claim 1 further comprising a filter media disposed on a first side of the support structure.

3. The apparatus as in claim 1 wherein the filter media support structure further comprises expanded metal.

4. The apparatus as in claim 1 wherein the filter media support structure further comprises tin-coated carbon steel.

5. The apparatus as in claim 1 wherein the filter media support structure further comprises stainless steel.

6. The apparatus as in claim 1 wherein the filter media support structure further comprises aluminum.

7. A fluid filter comprising:

a flange with inlet and outlet connections for a filtered fluid of the fluid filter disposed on a first side of the flange in fluid connection with an inlet and outlet port on a second side of the flange;

a pressure vessel disposed on a second side of the flange enclosing both inlet and outlet ports;

a generally cylindrically shaped pleated shell disposed on the second side of the flange within the pressure vessel with a wall of the pleated shell separating the inlet and outlet ports, the pleated shell having a first row of perforations in a planar surface element of the pleated shell parallel to a longitudinal axis of the pleated shell mutually separated, one from another, by a perforation distance along the longitudinal axis and at least a second row of perforations parallel to the first row of perforations offset from the first row of perforations along the longitudinal axis by a first offset distance greater than zero and less than one-half the perforation distance and offset along a second orthogonal axis of the planar surface element transverse to the longitudinal axis by a second offset distance.

8. The apparatus as in claim 7 further comprising a filter media disposed on a first side of the filter media support structure facing the pressure vessel.

9. The apparatus as in claim 7 wherein the filter media support structure further comprises expanded metal.

10. The apparatus as in claim 7 wherein the filter media support structure further comprises tin-coated carbon steel.

11. The apparatus as in claim 7 wherein the filter media support structure further comprises stainless steel.

12. The apparatus as in claim 7 wherein the filter media support structure further comprises aluminum.

* * * * *

UNITED STATES PATENT AND TRADEMARK OFFICE
CERTIFICATE OF CORRECTION

PATENT NO. : 5,589,067
DATED : December 31, 1996
INVENTOR(S) : Patrick E. Rice

It is certified that error appears in the above-indentified patent and that said Letters Patent is hereby corrected as shown below:

Col. 1, line 34, after "the flow", insert --of-

Col. 2, line 26, after "fluid filter 10", delete ",".

<u>In the Claims:</u>

Col. 3, line 54, change "Zag" to "zag".

Signed and Sealed this

Tenth Day of June, 1997

Attest:

BRUCE LEHMAN

Attesting Officer      Commissioner of Patents and Trademarks